United States Patent [19]

Riggs et al.

[11] 3,897,572

[45] July 29, 1975

[54] FORMED MEAT PRODUCT

[75] Inventors: Norman S. Riggs; Felicisimo S. Sarno, both of Long Beach, Calif.

[73] Assignee: Star-Kist Foods, Inc., Terminal Island, Calif.

[22] Filed: May 16, 1973

[21] Appl. No.: 360,735

[52] U.S. Cl. .............. 426/249; 426/250; 426/802; 426/805; 426/104
[51] Int. Cl. ............................................ A23p 1/00
[58] Field of Search .......... 426/249, 250, 262, 264, 426/805, 518, 383, 802

[56] References Cited
UNITED STATES PATENTS

| | | | |
|---|---|---|---|
| 2,761,786 | 9/1956 | George | 426/249 |
| 2,802,737 | 8/1957 | Anson | 426/364 |
| 3,100,710 | 8/1963 | Carlin | 426/104 |
| 3,290,152 | 12/1966 | Hartman | 426/250 |
| 3,372,654 | 3/1968 | Bell | 426/249 |
| 3,380,832 | 4/1968 | Bone | 426/250 |
| 3,416,931 | 12/1968 | Posegate | 426/249 |
| 3,574,633 | 4/1971 | Flier | 426/264 |
| 3,765,902 | 10/1973 | Charter | 426/249 |

*Primary Examiner*—Raymond N. Jones
*Assistant Examiner*—Ernest G. Therkorn
*Attorney, Agent, or Firm*—Fulwider, Patton, Rieber, Lee & Utecht

[57] ABSTRACT

A method for making a simulated fat-marbled formed meat chunk by comminuting meat and meat by-products and admixing the same with from about 5 to about 50 percent by weight of a moisture binding agent to form a red meat portion; grinding and emulsifying a second portion of meat and meat by-products and admixing the same with about 5 to about 50 percent by weight of a moisture binding agent and about 0.5 to about 10 percent by weight of a white food coloring agent, to form a white meat portion; forming a heterogeneous admixture of red and white meat portions by blending a major part of said red meat portion with a minor part of said white meat portion until said red meat portion is webbed with said white meat portion; extruding said heterogeneous admixture into a desired form cooking said extrudate, and dividing the cooked extrudate to the desired size.

11 Claims, No Drawings

FORMED MEAT PRODUCT

BACKGROUND OF THE INVENTION

1. Field of the Invention

The present invention relates to a formed meat product. More particularly, the present invention relates to a formed meat product suitable for use as a pet food.

2. Background of the Prior Art

In the area of pet foods, a great deal of work has been done in attempting to perfect a high protein, low cost meat product which has the appearance of chunks of red meat and especially fat-marbled red meat. For example, U.S. Pat. No. 3,380,832 discloses a marbled meat product made by cooking a mixture of meat particles and sodium caseinate binder followed by extrusion of the formed meat product into separate red and white layers. The cooked, extruded red and white layers are superimposed and compressed together to form the resultant product which is stated to have the appearance of fat marbled meat. A defect of the above described product is its inability to maintain its appearance under retort conditions. That is, under the temperatures and pressures of retorting, the above described meat product disintegrates. U.S. Pat. No. 3,574,633 also discloses a canned pet food in which particles of meat and meat by products are compacted at low temperatures under pressure while raw to form meat chunks and the resulting chunks are canned and cooked in the can.

The prior art also discloses that wheat gluten has been used to adhere chunks of meat together both in the raw and cooked form. Thus, a meat product made of meat chunks adhered to each other with wheat gluten which may be cooked and sliced without falling apart, is described in U.S. Pat. No. 3,100,710.

SUMMARY OF THE INVENTION

The present invention overcomes the foregoing problems and disadvantages by providing a simulated fat marbled meat chunk which retains the natural meat juices and maintains its shape and appearance following retort. The foregoing simulated fat marbled meat chunk is made by:

1. comminuting a first portion of meat and meat by products and admixing the same with from about 5 to about 50 percent by weight of a moisture binding agent to form a red meat portion;
2. comminuting a second portion of meat and meat by-products and admixing the same with about 5 to about 50 percent by weight of moisture binding agent and about 0.5 to about 10 percent by weight of a white food coloring agent to form a white meat portion;
3. forming a heterogeneous admixture of said red and white meat portions by blending a major part of said red meat portion with a minor part of said white meat portion until said red meat portion is webbed with said white meat portion;
4. extruding said heterogeneous admixture;
5. cooking the resulting extrudate; and
6. dividing the cooked extrudate into chunks.

The invention also relates to a meat chunk which retains its natural juices and maintains its shape and appearance following retort, but which has no simulated fat marbling. This meat chunk is made by a process comparably to the process described above with steps 2 and 3 omitted.

DETAILED DESCRIPTION OF THE INVENTION

While the present invention will be described in detail with reference to the simulated fat marbled meat chunk, one of skill in the art will understand that the meat chunk without the simulated fat marbling may also be made by the present process by omitting the marbling steps.

The meat and meat by-products which may be used in the present invention include the meat or meat by-products of fowl and fish as well as that of mammals such as, for example, cattle, swine, sheep, goats, horses, whales, etc. It will be understood that other animal meats containing proteinaceous material and suitable for pet animal consumption may be used in the practice of the invention.

Moisture binding agents which may be used in the invention include wheat gluten, powdered egg, soya protein and mixtures thereof. The moisture binding agents act to absorb the natural juices of the meat that would otherwise be lost during the cooking process. Wheat gluten is preferred because of its high protein content. The amount of moisture binding agents which may be used in the present invention ranges from about 5 to about 50 percent by weight. The preferred amount of wheat gluten which may be used in the present invention ranges between about 5 to about 20 percent by weight. The preferred amount of powdered egg which may be used in the present invention ranges between about 20 and about 40 percent by weight.

Wheat gluten is the protein component of wheat and is prepared by separating wheat (which contains about 8–15percent protein) into its components, wheat starch and wheat gluten. The wheat gluten fraction generally contains about 80 percent protein.

The coloring agents which may be used in the present invention include all of the conventional coloring agents. The preferred white coloring agent is $TiO_2$. $TiO_2$ may be used in amounts ranging between about 1 to about 10 percent and preferably about 2 to about 4 percent by weight. For example, to provide about 0.6 percent $TiO_2$ in the final marbled meat product, the white meat portion (containing the $TiO_2$) should have about 2.9 percent by weight $TiO_2$ if a ratio of about 4:1 parts red meat portion to white meat portion is used. To minimize the necessity of use of a white coloring agent, tripe is preferred as a substantial part of the white meat portion.

If it is deemed desirable, red meat coloring may be used to enhance the red color of the red meat portion. The preferred red meat coloring agent is iron oxide. The amount of iron oxide to be used ranges between about 0.05 percent to about 0.3 percent and preferably about 0.15 to about 0.25 percent by weight iron oxide.

The manner of combining the red and white meat portions to form the simulated fat marbled meat chunk is critical to the present invention. Generally a major portion of the red meat and a minor portion of the white meat are combined. More specifically, a ratio of about 8:1 to about 2:1 and preferably about 5:1 to about 3:1 red meat to white meat is used. The red and white meat portions are carefully blended together until the red meat portion is webbed with the white meat portion. If clumps of white meat are visible, the combination has been underblended. If no white meat is visible, the combination has been overblended.

It has also been discovered that the temperature of the red and white meat portions at the time of combining is important to the invention. We have found that the preferred simulated fat marbled meat chunk can advantageously be made by combining the red and white meat portions in a partially thawed state, i.e., about 25°–35°F. To obtain the desired temperature, each meat portion may advantageously be comminuted at a temperature between about 20° and 30°F. The heat generated by the comminuting process will raise the temperature of the meat portions to the desired 25°–35°F temperature. In addition, we have found that the use of the foregoing temperatures enables us to use less of the moisture binding agent and still obtain the same beneficial results.

The resultant red and white meat combination is then extruded into the desired shape. For example, the red and white meat combination may be extruded into sheets varying in thickness between about ¼ and 3 inches and preferably between about ½ to about 1 ½ inches, or into elongated solid shapes having cross sections between about ¼ and 1 ½ inches and preferably between about ½ and ¾ inches.

The extrudate is then cooked by conventional means, such as, for example, in a continuous steam cooker, direct steam, boiling water, hot air, etc. Direct steam (212°F) cooking is preferred. For example, a ¼ inch sheet should be cooked about 5–10 minutes by direct steam; a 1 inch sheet should be cooked about 25–35 minutes by direct steam.

The resultant cooked extrudate is then cut into chunks to produce the simulated fat marbled meat chunk of the present invention. The chunks are preferably canned alone or in the presence of up to about 75 percent of vegetables and/or gravy. As used herein, the term "gravy" means a mixture of water and thickening agent, e.g. starch, with or without additional ingredients, i.e. cream, vitamins, vegetables, fat, etc. The canned product is then retorted using standard retort procedures, e.g. 250°F for 65 minutes for 6 ½ oz. can.

The final product maintains the simulated, fat marbled meat chunk appearance notwithstanding the retorting procedures. If the simulated meat product is extruded into small diameter balls or other shapes prior to cooking, no additional breaking apart of the cooked product may be necessary.

The following examples set forth certain preferred formulations for pet foods which embody the principles of the present invention. As used herein the term "parts" and the term "percent" (or) refer to parts by weight and percent by weight respectively.

EXAMPLE I

This example illustrates the manufacture of unmarbled formed meat which will not disintegrate under normal retorting temperatures.

The ingredients making up the formed meat were thoroughly mixed in a conventional mixer for 10 minutes in the proportions indicated in Table 1.

Table 1

|  | Parts by Weight |
| --- | --- |
| Beef liver | 77.8 |
| Wheat gluten | 19.4 |
| Condensed fish by-products | 0.7 |
| Beef fat | 2.2 |

Frozen beef liver was tempered overnight in the open air. The tempered liver, which had a temperature of about 30°F, was broken into pieces approximately 1 × 2 to 1 × 4 in an extructor. The pieces were conveyed to and ground on the grinder equipped with a ½ grinding plate. The resultant material was then ground on a grinder equipped with a ⅛ plate.

The ground liver was then thoroughly mixed with the beef fat, condensed fish solubles, and wheat gluten. The admixture was mixed for approximately 10 minutes, then it was conveyed into an extruder which formed and cut the admixture into pieces approximately 1 ½ × 1 ½ in size. The extrudates were placed into a water blancher heated to 210°F and were cooked for approximately 15 minutes. The cooked pieces were conveyed to and passed through a dicer which cut the cooked pieces to cubes approximately ⅜ × ½ × ⅜ in size. The cubes were then conveyed into a filling machine bowl and mixed with gravy at the rate of 1 part liver cubes to 2 parts gravy. The mixture of the gravy and liver cubes was packed and sealed in 6.5 oz. cans and retorted at 250°F for 65 minutes. (The gravy consisted of 85.9 parts water, 2 parts soy flour, 2 parts dried whey, 4.5 parts starch, 4 parts beef fat, 0.25 parts cream, coloring agents and vitamins.) Upon inspection, the resultant formed meat product had the appearance of distinct chunks of meat.

EXAMPLE II

Example I was repeated, except that part of the gluten was replaced with powdered whole eggs and fish meal was added to improve the protein content of the formed meat, in the proportion indicated in Table 2.

Table 2

|  | Parts by Weight |
| --- | --- |
| Beef liver | 70 |
| Powdered egg | 10 |
| Wheat gluten | 5 |
| Fish meal | 7.5 |
| Condensed fish by-products | 1.9 |
| Beef fat | 5.6 |

EXAMPLE III

This example illustrates the manufacture of fatmarbled meat which will not disintegrate under normal retorting temperatures when packed with or without gravy.

The ingredients making up the "red portion", and making up the "white portion" were thoroughly mixed in separate blenders for approximately 10 minutes in the proportions indicated in Table 3.

Table 3

|  | Parts by Weight | |
| --- | --- | --- |
|  | Red Portion | White Portion |
| Boneless Beef | 65.9 | — |
| Beef liver | 10.0 | — |
| Lungs | 6.4 | — |
| Powdered eggs | 12.0 | — |
| Wheat gluten | 3.0 | 15.0 |
| Water | 2.5 | 5.0 |
| Iron oxide | 0.2 | — |
| Poultry viscera | — | 50.0 |
| Chicken, necks & backs | — | 27.0 |
| Titanium dioxide | — | 3.0 |

Five parts of the red portion were mixed with one part of the white portion in a blender until the white portion was webbed on the red portion. During mixing of the red portion with the white portion, the temperatures of both portions were about 35°F. The admixture was then conveyed into an extruder which formed the admixture into sheets approximately 1 ¾ × 4 × 24 in size. The sheets were laid on wire baskets which were provided with polyethylene liners. The baskets were placed on racks which were then put inside a steam retort. The sheets were cooked inside the steam retort for approximately 25 minutes at a temperature of 212°F.

The cooked meat was diced into approximately ½ × ½ cubes. The resultant meat chunks were packed in 6.5 oz. cans with 5 percent by weight re-Hydrated vegetables and 50 percent by weight gravy. (The gravy consisted of 96 percent water and 4 percent starch). The cans were sealed and retorted at 250°F for 65 minutes. Upon inspection, the resultant product had the appearance of discrete chunks of fat marbled meat.

EXAMPLE IV

This example illustrates the manufacture of fatmarbled meat which utilized powdered whole egg as the moisture combining agent.

The ingredients making up the red portion and the white portion were thoroughly mixed in separate blenders for approximately 10 minutes in the proportion indicated in Table 4.

Table 4

| | Parts by Weight | |
|---|---|---|
| | Red Portion | White Portion |
| Boneless beef | 70.0 | 54.2 |
| Powdered egg | 27.3 | 38.3 |
| Iron Oxide | 0.2 | — |
| Titanium dioxide | — | 3.3 |
| Water | 2.5 | 4.2 |

Five parts of the red portion were mixed with one part of the white portion in a blender until the white portion was webbed on the red portion. During mixing of the red portion with the white portion, the temperatures of both portions were about 30°F. The admixture was then conveyed into an extruder which formed the admixture into sheets approximately 2 ¾ × 4 × 24 in size. The sheets were laid on wire baskets which were provided with polyethylene liners. The baskets were placed on racks which were then put inside a steam retort. The sheets were cooked inside the steam retort for approximately 45 minutes at a temperature of 216°F.

The cooked meat was diced into approximately ⅝ × ⅝ cubes. The resultant meat chunks were packed in 6.5 oz. cans with 50 percent by weight gravy. (The gravy consisted of 96 percent water and 4 percent starch). The cans were sealed and retorted at 250°F for 65 minutes. Upon inspection, the resultant product had the appearance of discrete chunks of fat marbled meat.

We claim:

1. A method for making a simulated fat-marbled formed meat chunk comprising;
   1. preparing a red meat portion by comminuting red meat and red meat by-products and admixing the same with a moisture binding agent selected from the class consisting of wheat gluten, soya protein, powdered egg and mixtures thereof in an amount from about 5 to about 50 weight percent and sufficient to absorb the natural juices of the meat released during cooking to form said red meat portion;
   2. preparing a white meat portion by comminuting a a second portion of meat and meat by-products and admixing the same with a moisture binding agent selected from the class consisting of wheat gluten, soya protein, powdered egg and mixtures thereof in an amount from about 5 to about 50 weight percent and sufficient to absorb the natural juices of the meat released during cooking and about 0.5 to about 10 percent by weight of a white food coloring agent to form a white meat portion;
   3. forming a heterogeneous admixture of said red and white meat portions by blending a major part of said red meat portion with a minor part of said white meat portion until said red meat portion is webbed with said white meat portion;
   4. extruding said heterogeneous admixture;
   5. cooking said extrudate; and
   6. dividing the cooked extrudate into chunks.

2. The method of claim 1 having the additional step of canning and retorting the simulated fat-marbled meat chunks.

3. The method of claim 1 wherein the white food coloring agent is $TiO_2$.

4. The method of claim 1 wherein the heterogeneous admixture is extruded into sheets having a thickness between about ¼ and about 3 inches.

5. The method of claim 1 wherein the red meat portion and the white meat portion are blended in a ratio of about 8:1 to about 2:1 red meat portion to white meat portion.

6. The method of claim 2 having the additional step of adding up to about 75 percent by weight of the formed meat product of gravy.

7. The method of claim 1 wherein said red meat and red meat by-products comprise meat and from 0.05 to 0.3 weight percent of an added red coloring agent.

8. A method for making a simulated, fat-marbled meat chunk comprising:
   1. preparing a red meat portion by comminuting a first portion of red meat and red meat by-products and admixing the same with wheat gluten in an amount from about 5 to about 20 percent by weight and sufficient to absorb the natural juices of the meat released during cooking;
   2. comminuting a second portion of meat and meat by-products and admixing the same with wheat gluten in an amount from about 5 to about 20 percent by weight and sufficient to absorb the natural juices of the meat released during cooking and about 1 to about 10 percent by weight of white food coloring agent to form a white meat portion;

9. The method of claim 8 wherein the white food coloring agent if $TiO_2$.

10. The method of claim 8 wherein the red and white meat portions in step 3 are at a temperature between 25° and 35°F.

11. The method of claim 8 wherein said red meat and red meat by-products comprise meat and from 0.05 to 0.3 weight percent of an added red coloring agent.

* * * * *

UNITED STATES PATENT OFFICE
CERTIFICATE OF CORRECTION

Patent No. 3,897,572     Dated     July 29, 1975

Inventor(s) Norman S. Riggs; Felicisimo S. Sarno

It is certified that error appears in the above-identified patent and that said Letters Patent are hereby corrected as shown below:

In the Specification, Column 4, line 4, after "1" insert --inch--; line 5, after "2", "1" and "4" insert --inch--; line 6, after "1/2" insert --inch--; line 8, after "1/8" insert --inch--; line 14, after "1 1/2" and "1 1/2" insert --inch--; line 18, after "3/8", "1/2" and "3/8" insert --inch--.  Column 5, line 7, after "1 3/4", "4", "24" insert --inch--; line 13, after "1/2" insert --inch--; line 14, after "1/2" insert --inch--, line 47, after "2 3/4", "4" and "24" insert --inch--, line 53, after "3/8" insert --inch--, line 54, after "3/8" insert --inch--.

In the Claims, Claim 8, please add elements 3 through 8.
Claim 9, line 2, change "if" to --is--.

Signed and Sealed this fourth Day of November 1975

[SEAL]

Attest:

RUTH C. MASON
Attesting Officer

C. MARSHALL DANN
Commissioner of Patents and Trademarks